US010099536B2

(12) United States Patent
Albin et al.

(10) Patent No.: US 10,099,536 B2
(45) Date of Patent: Oct. 16, 2018

(54) AIR VENT FOR A VEHICLE

(71) Applicant: GM GLOBAL TECHNOLOGY OPERATIONS LLC, Detroit, MI (US)

(72) Inventors: Douglas Albin, New Baltimore, MI (US); Mingyang Jia, Troy, MI (US); Larry J. Suarez, Rochester Hills, MI (US); Teresa L. Cerbolles, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 850 days.

(21) Appl. No.: 14/557,913

(22) Filed: Dec. 2, 2014

(65) Prior Publication Data

US 2016/0152116 A1     Jun. 2, 2016

(51) Int. Cl.
*B60H 1/34* (2006.01)

(52) U.S. Cl.
CPC .................. *B60H 1/3421* (2013.01)

(58) Field of Classification Search
CPC .............................. B60H 1/3421; B60H 1/34
USPC ................................................. 454/152, 155
See application file for complete search history.

(56) References Cited

U.S. PATENT DOCUMENTS

| | | | | |
|---|---|---|---|---|
| 3,811,369 A | * | 5/1974 | Ruegg | F24F 13/072 239/437 |
| 4,824,023 A | * | 4/1989 | Sugawara | F24F 13/06 239/509 |
| 5,356,336 A | * | 10/1994 | Stouffer | B60H 1/34 454/155 |
| 7,029,390 B2 | | 4/2006 | Karadia | |
| 8,382,564 B2 | | 2/2013 | Miki | |
| 8,662,970 B2 | * | 3/2014 | Nagasaka | B60H 1/3421 454/152 |
| 9,163,848 B2 | | 10/2015 | Doll et al. | |
| 2004/0152412 A1 | | 8/2004 | Gehring et al. | |
| 2008/0014855 A1 | * | 1/2008 | Leserre | B60H 1/3414 454/155 |
| 2008/0081550 A1 | * | 4/2008 | Shibata | B60H 1/3421 454/155 |

(Continued)

FOREIGN PATENT DOCUMENTS

| | | |
|---|---|---|
| CN | 1451922 A | 10/2003 |
| DE | 1020091048677 A1 | 5/2010 |
| DE | 1020121013607 A1 | 1/2013 |

*Primary Examiner* — Gregory Huson
*Assistant Examiner* — Dana Tighe
(74) *Attorney, Agent, or Firm* — Quinn IP Law

(57) ABSTRACT

An air vent for a vehicle includes a housing extending between an inlet and outlet end. The housing includes a first wall and a second wall that cooperate to define an interior volume therebetween. The inlet end defines an inlet opening and air enters the interior volume through the inlet opening. The outlet end has a length and a width that cooperate to define an outlet opening having a low aspect ratio. Air exits the interior volume through the outlet opening. The first wall includes a directional wall section that extends non-linearly from a transition location to the outlet end. Air travelling through the interior volume is directed by the directional wall section to create a flow direction of air exiting the outlet opening. Vanes may be disposed in the interior volume to allow directability of air exiting the outlet opening, while providing a low pressure drop therethrough.

8 Claims, 5 Drawing Sheets

(56) References Cited

U.S. PATENT DOCUMENTS

| | | | |
|---|---|---|---|
| 2010/0011799 A1* | 1/2010 | Sakakibara | B60H 1/3414 62/426 |
| 2014/0302769 A1* | 10/2014 | Sawada | B60H 1/3421 454/315 |
| 2014/0357178 A1* | 12/2014 | Doll | F24F 13/072 454/284 |
| 2014/0357179 A1 | 12/2014 | Londiche et al. | |
| 2016/0101668 A1 | 4/2016 | Doll et al. | |
| 2016/0200178 A1 | 7/2016 | Londiche et al. | |

* cited by examiner

US 10,099,536 B2

AIR VENT FOR A VEHICLE

TECHNICAL FIELD

The present disclosure is related to an air vent for a vehicle.

BACKGROUND

Modern passenger vehicles include a heating, ventilation, and air conditioning (HVAC) system that allows a vehicle occupant to control the temperature or adjust other settings of a vehicle interior. For instance, a motor-driven fan or blower circulates conditioned air to the vehicle interior through air vents. Some vehicles are equipped with heated and/or cooled seats, a heated steering wheel, and other features that collectively improve the overall drive experience. A typical HVAC system includes front and rear defrosters for improving visibility through the windshield and rear window, respectively. An occupant of the vehicle selects desired HVAC system settings using dials, knobs, push-buttons, and/or touch screens.

SUMMARY

One possible aspect of the disclosure provides an air vent for a vehicle having a heating, ventilation, and air conditioning (HVAC) system. The air vent includes a housing. The housing extends longitudinally between an inlet end and an outlet end. The housing includes a first wall and a second wall disposed in spaced relationship to the second wall such that the walls cooperate to define an interior volume therebetween. The first wall and the second wall extend longitudinally between the inlet end and the outlet end. The inlet end defines an inlet opening in communication with the interior volume such that air is permitted to enter the interior volume through the inlet opening. The outlet end defines an outlet opening in communication with the interior volume such that air is permitted to exit the interior volume through the outlet opening. The outlet opening is generally perpendicular to an outlet axis. The first and/or second wall includes a directional wall section that extends non-linearly from a transition location to the outlet end. The directional wall section is longitudinally disposed between the ends such that air travelling through the interior volume and out of the outlet end is directed by the directional wall section, toward the outlet end, so as to create a flow direction of air exiting the interior volume through the outlet opening that is angled with respect to the outlet axis.

Therefore, the flow direction of air exiting the interior volume of the housing is directed by the shape of the directional wall section of the first and/or second walls. Since the directional wall section(s) dictate the flow direction of air exiting the outlet opening, the outlet opening may be sized to have a high aspect ratio. The outlet opening may be bounded by sides having a length and a width. The outlet opening may be configured with the length being significantly greater than the height, or vice versa, to yield an outlet opening with a high aspect ratio, i.e., a long, narrow opening.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the disclosure may be described herein in terms of functional and/or logical block components and/or various processing steps. It should be realized that such block components may be comprised of any number of hardware, software, and/or firmware components configured to perform the specified functions.

Figure 1:
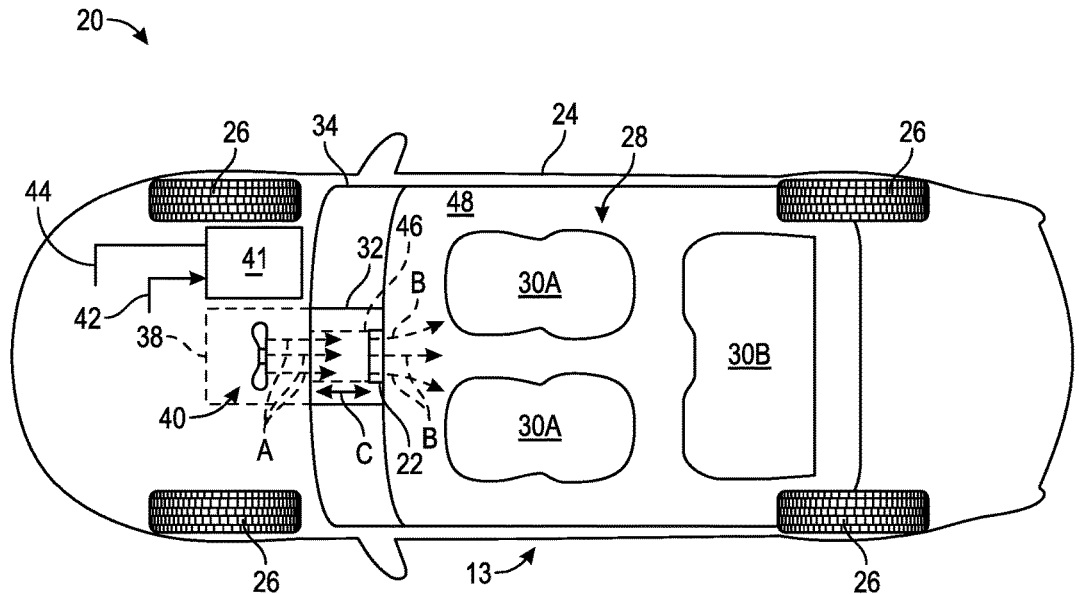
FIG. 1 is a schematic plan view illustration of an example vehicle having an air vent as described in the present disclosure.

Referring to the drawings, wherein like reference numbers refer to the same or similar components throughout the several views, an example vehicle 20, such as a motor vehicle, is shown in FIG. 1 having an air vent 22 as set forth herein. The vehicle 20 includes a body 24 positioned with respect to a set of wheels 26, with the body 24 defining an interior 28, i.e., a passenger compartment or cabin. Within the interior 28 is positioned at least one row of seats 30A, which is depicted in FIG. 1 as example respective first and second row of seats 30A, 30B. The first row of seats 30A may include respective driver-side and passenger-side seats as shown. Other seating configurations may be envisioned without departing from the intended inventive scope, including only the first row of seats 30A, bench-style seats or bucket seats in either row of seats and, or an additional row of seats (not shown). Example embodiments of the air vent 22 are depicted in FIGS. 3-13. It should be appreciated that the air vent 22 is not limited to being used in a vehicle 20, as the air vent 22 may be used with other structures or devices, such as, but not limited to, buildings, watercraft, aircraft, electronic devices, and the like.

Figure 2:
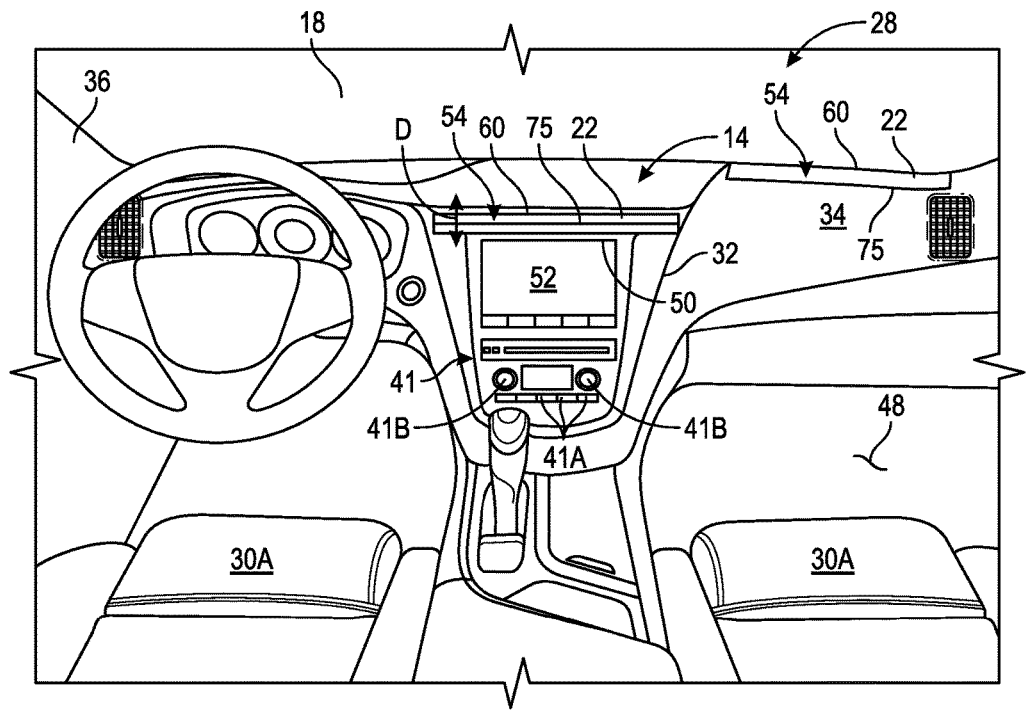
FIG. 2 is a perspective view illustration of an example vehicle interior having a center stack containing an embodiment of the air vent of FIG. 1.

A possible configuration and placement of the air vent 22 is shown in FIG. 2. The air vent 22 of FIG. 1 may be optionally positioned within a center stack 32 of the interior 28, adjacent to a dashboard 34. In other embodiments the air vent 22 may be positioned anywhere along the dashboard 34; within a ceiling (not shown); within one or more pillars, i.e., an A-pillar 36, a B-pillar, and the like; with respect to the rear row of seats 30B, such as between the front row of seats 30A and the rear row of seats 30B and/or adjacent the rear row of seats 30B; and the like. For example, the rear row of seats 30B may be divided into separate seating areas by an arm rest (not shown) or other structure, with the air vent 22 positioned within or adjacent to such structure.

The air vent 22 is in communication with a heating, ventilation, and air conditioning (HVAC) system 38 having an air circulation device 40, for instance a motor-driven fan or blower, and with a controller 41. The HVAC system 38 receives HVAC control setting signal (arrow 44) from the controller 41 in response to user-selected HVAC settings (arrow 42) from controls 41, such as buttons 41A, knobs 41B, and the like. In response to the received HVAC control setting signal (arrow 44), the HVAC system 38 circulates ambient, heated, or cooled air (arrows A) into the interior 28, for instance through a duct 46 and the air vent 22. In embodiments in which the air vent 22 is used in proximity to the rear row of seats 30B, the duct 46 may be extended beyond the front row of seats 30A such that the duct 46 supplies the air (arrows A) to the air vent 22 wherever the air vent 22 is positioned within the interior 28. The air is then directed from the air vent 22, into the vehicle interior 28, in a desired direction (arrow B).

Referring to FIG. 2, which depicts a possible configuration of the interior 28, the air vent 22 is shown positioned within the center stack 32. As is well known in the art, a center stack 32 is a control console positioned between the driver-side seat and the passenger-side seat, in the first row of seats 30A, typically extending from the dashboard 34 toward a floor 48 of the interior 28.

The design disclosed herein provides a profile of the air vent 22, visible to the occupant of the vehicle, having a high aspect ratio. More specifically, the air vent 22 may have define an outlet opening 54 having a generally rectangular profile having a pair of first sides 49, extending along a length L, and a pair of second sides 51, extending along a height H, with the aspect ratio being the ratio of the longer sides to the shorter sides, e.g., a ratio of the length L to the height H. The first and second sides 49, 51 cooperate to define an outlet opening 54, through which air exits the air vent 22, as described in more detail below. Therefore, the design provided allows a high aspect ratio, meaning, for example, the length L may be significantly greater than the height H. By way of a non-limiting example, the aspect ratio may be at least 5. As such, the air vent may be disposed within the vehicle to have a very elongated, yet narrow profile, without sacrificing the ability to direct the flow of air (arrow B) in a desired direction within the interior 28 of the vehicle 20 with a low pressure drop, as will be explained in more detail below. However, it should be appreciated that smaller aspect ratios may also be achieved, including, but not limited to an aspect ratio of 1.

In the embodiment of FIG. 2, the air vent 22 is positioned between a windshield 18 and a main display screen 52, i.e., adjacent to or along a top edge 50 of a main display screen 52, as viewed from the normal forward-looking driving perspective of an operator of the vehicle 20. However, as noted above the air vent 22 may also be positioned elsewhere in the interior 28 without departing from the intended inventive scope. Placement of the air vent 22, regardless of the embodiment, may be in sufficiently close proximity to an occupant, whether a driver or a front/rear seat passenger of the vehicle 20 of FIG. 1, such that the occupant can comfortably reach the air vent 22 from a seated position.

Figure 6:
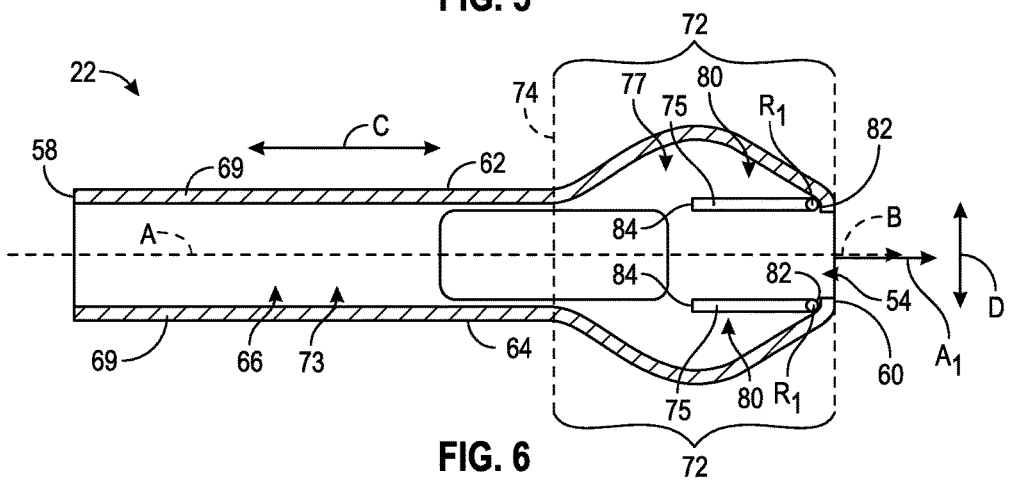
FIG. 6 is a schematic cross-sectional side view of the air vent, taken along line 6-6 of FIG. 5, with the outlet vanes in a neutral position, with respect to the first and second walls.
Figure 7A:
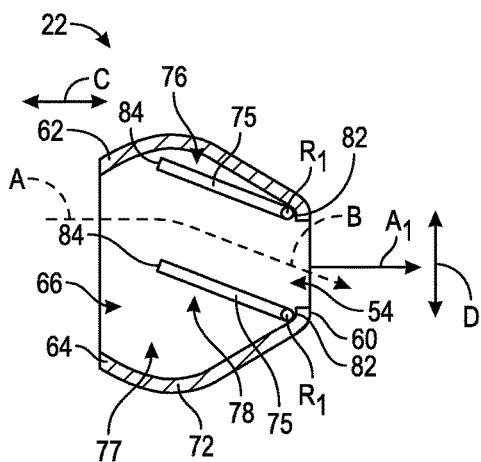
FIG. 7A is a schematic cross-sectional side view of the air vent of FIG. 5, illustrating one of the outlet vanes being in a first position, with respect to a first wall, while the other one of the outlet vanes is in a second position, with respect to the second wall.
Figure 7B:
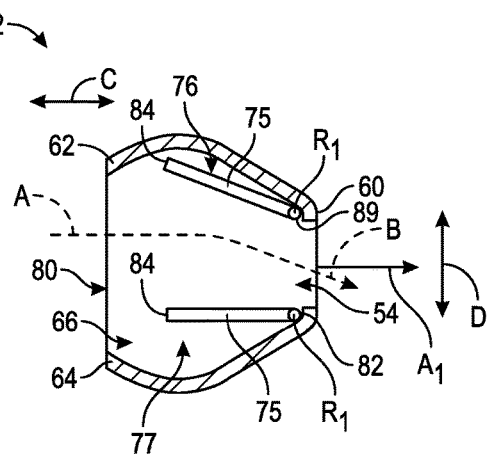
FIG. 7B is a schematic cross-sectional side view of the air vent of FIG. 5, illustrating one of the outlet vanes being in a first position while the other vane is in the neutral position.
Figure 8:
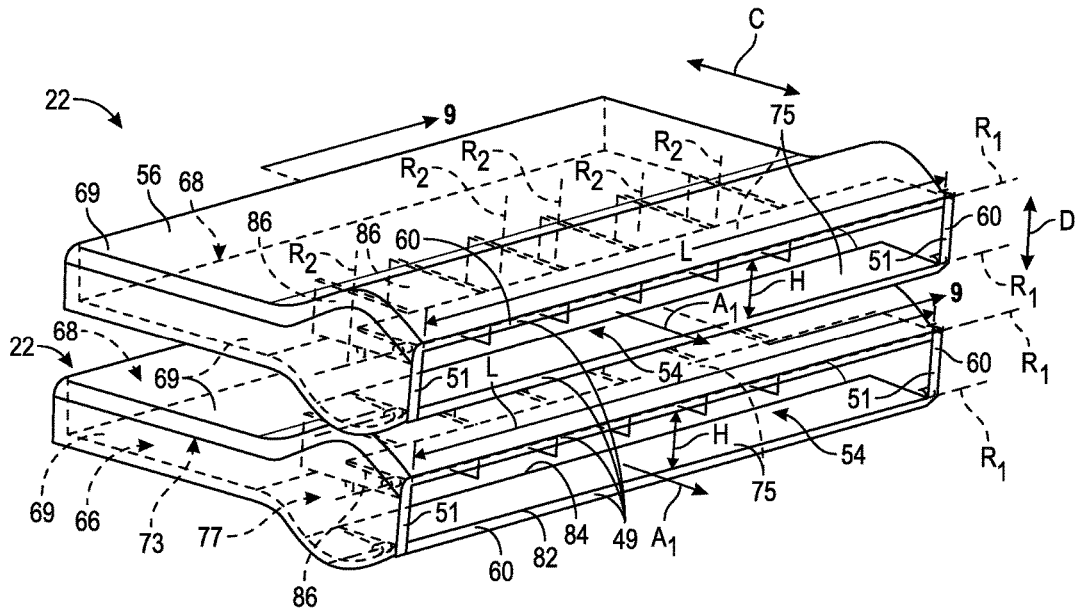
FIG. 8 is a schematic perspective view of a pair of stacked air vents, each having a pair of outlet vanes.
Figure 9:
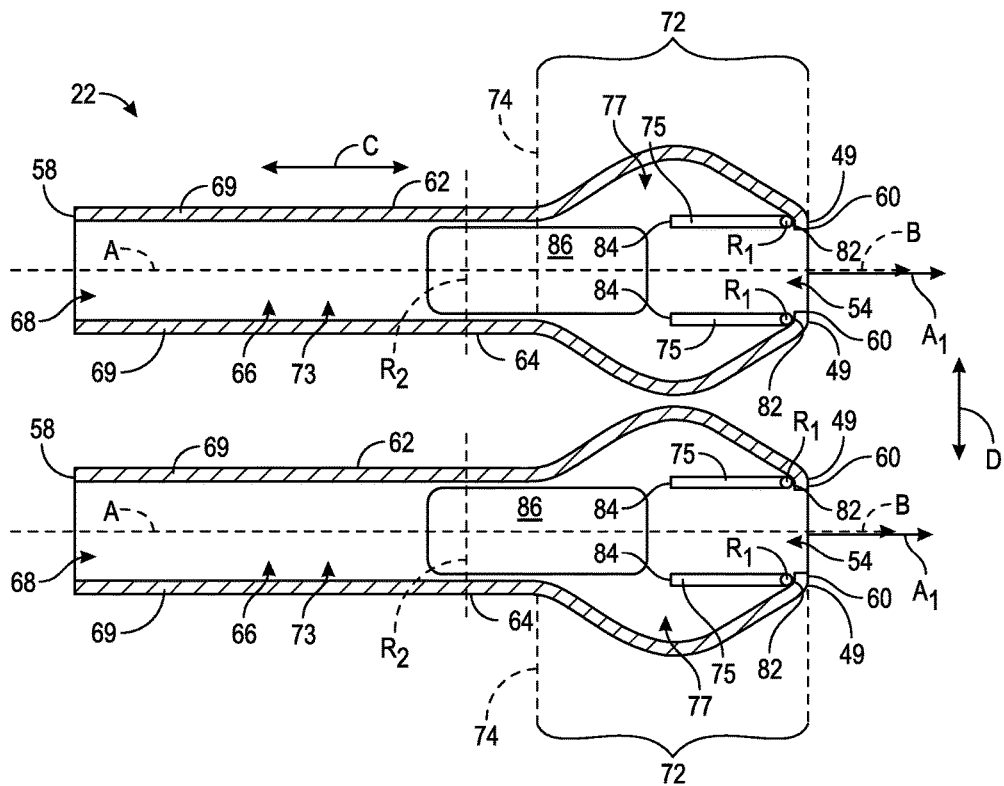
FIG. 9 is a schematic cross-sectional side view of the air vent, taken along line 9-9 of FIG. 8, with the outlet vanes of each air vent illustrated in a neutral position, with respect to the first and second walls

Referring to FIGS. 3-7B, the air vent 22 may be a single air vent 22 or, as shown in FIGS. 8 and 9, a pair of stacked air vents 22. The stacked air vents 22 may be identically configured or may have different configurations from one another. The air vent 22 is in fluid communication with the air circulation device 40 of FIG. 1, such that the air (arrows B of FIG. 1) enters the interior 28 through an outlet opening 54 in the air vent 22. The direction of airflow (arrow B) may be selected by the occupant of the vehicle 20 of FIG. 1. Depending on the design, such control may be manually achieved via dials (not shown), a tab connected to one or more vanes, gears, thumbwheel, electronically selectable device, and the like.

Figure 3:
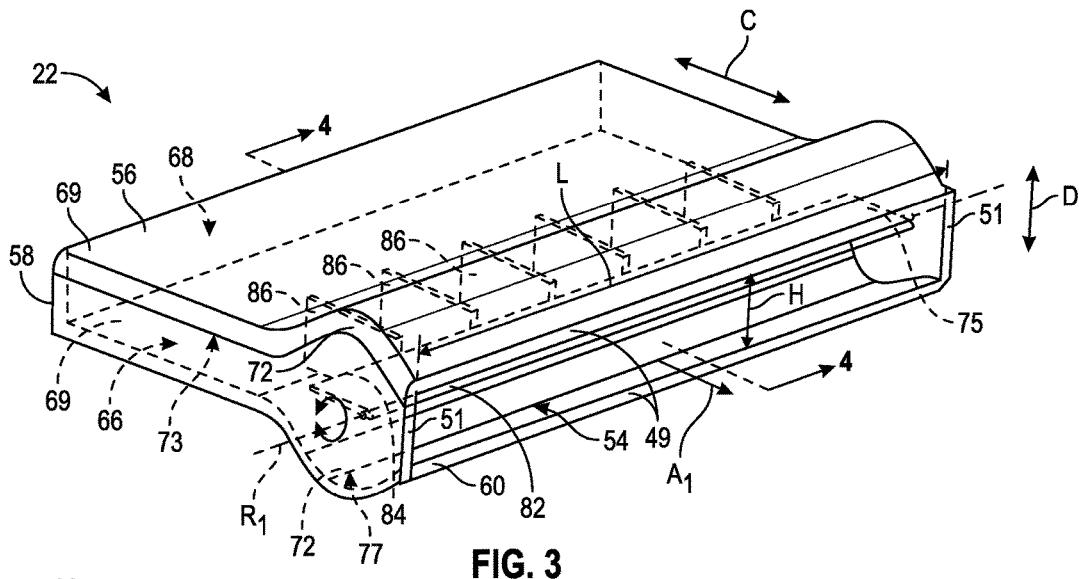
FIG. 3 is a schematic perspective view of the air vent of FIG. 2 having a single outlet vane.
Figure 4:
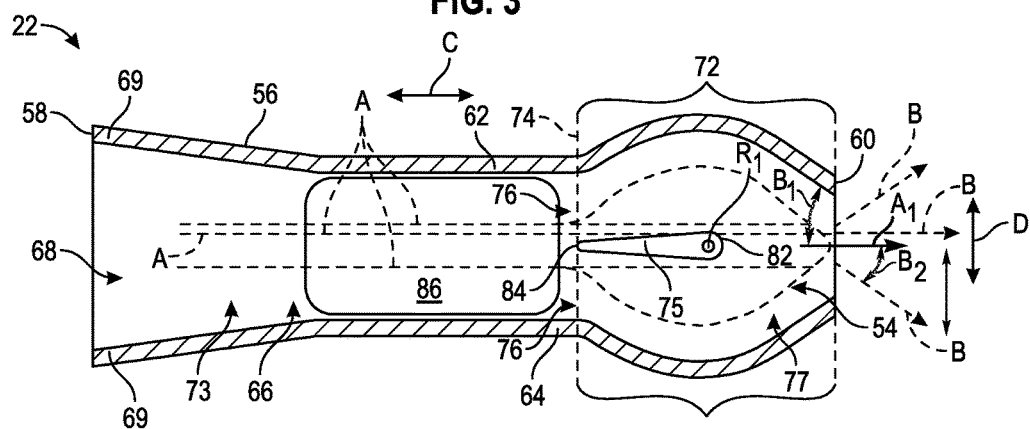
FIG. 4 is a schematic cross-sectional side view of the air vent, taken along line 4-4 of FIG. 3, with the outlet vane in a neutral position.
Figure 4A:
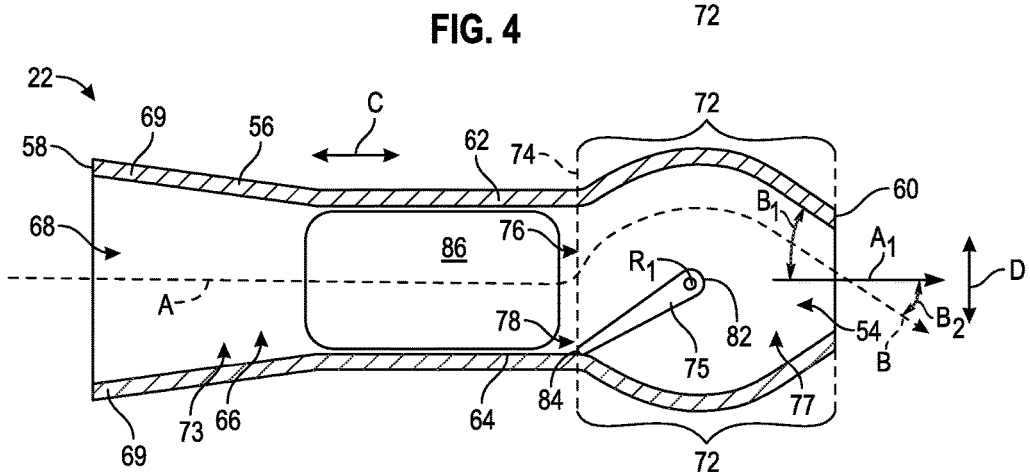
FIG. 4A is a schematic cross-sectional side view of the air vent of FIG. 3, illustrating the outlet vane being in a first position, with respect to a first wall, while simultaneously being in a second position, with respect to a second wall.

Referring now to the embodiment shown in FIGS. 3-4A, the air vent 22 includes a housing 56. The housing 56 extends longitudinally (arrow C) between an inlet end 58 and an outlet end 60. Referring to FIGS. 4 and 4A, the housing 56 includes a first wall 62 and a second wall 64 extending longitudinally (arrow C) between the inlet end 58 and the outlet end 60. The first wall 62 is disposed in spaced relationship to the second wall 64 such that the first wall 62 and the second wall 64 cooperate to define an interior volume 66 therebetween. The inlet end 58 defines an inlet opening 68 in communication with the interior volume 66 such that air is permitted to enter the interior volume 66 through the inlet opening 68. Similarly, the outlet end 60 defines an outlet opening 54 in communication with the interior volume 66 such that air is permitted to exit the interior volume 66 through the outlet opening 54.

Referring to FIGS. 3-6 and 8-13, the first wall 62 and the second wall 64 each include an inlet wall section 69 that extends from the inlet end 58, toward a transition location 74. It should be appreciated that the inlet wall section 69, may not be uniform in shape and may have multiple cross sectional areas and angles, depending on the surrounding environment packaging conditions. The transition location 74 is located between the inlet end 58 and the outlet end 60. An inlet chamber 73 is defined by the inlet wall sections. The transition location 74 may be a location along the respective wall 62, 64, between the inlet and outlet ends 58, 60.

The first wall 62 and the second wall 64 each include a directional wall section 72. The directional wall sections 72 each extend from a transition location 74 to the outlet end 60. An outlet chamber 77 is defined by the directional wall sections 72, i.e., between the transition location 74 and the outlet opening 54. The outlet opening 54 is perpendicular to an outlet axis $A_1$. The directional wall sections 72 may be non-linear, as will be explained in more detail below. The transition location 74 may be the location along one or both of the first and second walls 62, 64, in the direction of the outlet end 60, where the walls 62, 64 are no longer linear. As such, an outlet chamber 77 is defined by the directional wall sections 72 between the transition location 74 and the outlet end 60. The non-linearity of the directional wall section(s) 72 serve to change the direction of air, travelling longitudinally (arrow C) through the outlet chamber 77, toward the outlet end 60. As such, air may be directed by the directional wall section(s) 72 so as to create, or otherwise impart, a flow direction of at least some of the air exiting the outlet chamber 77, through the outlet opening 54. Therefore, the directional wall section(s) 72 direct at least some of the air, so that the air exits the outlet chamber 77 through the outlet opening 54 in diverging relationship to the outlet axis A1. By way of a non-limiting example, assuming the outlet axis A1 extends in a horizontal direction, i.e., is normal to the outlet opening 54, the directional wall section 72 may serve to direct air exiting the outlet chamber 77 in a vertical direction (arrow D), relative to the outlet axis A1. Therefore, the direction of air exiting the outlet chamber 77 may be controlled using a profile or contour of the directional wallf section 72. It should be appreciated, however, that the air may allow be directed in a horizontal direction or a vertical/horizontal direction, relative to the outlet axis A1, based on an orientation of the outlet vanes 75.

Referring to FIGS. 3-7B, 11, and 12, the directional wall sections 72 each present a curved profile in cross-section. The curve of the directional wall section 72 of the first wall 62 opens to, or otherwise faces, the curved profile of the directional wall section 72 of the second wall 64. As such, in cross-section, the directional wall section 72 of the first wall 62 and the second wall 64 may cooperate to be generally circular. However, it should be appreciated that the directional wall sections 72 of the first wall 62 and the second wall 64 may have cross-sectional profiles having other shapes, see for example FIGS. 10 and 13, so long as the desired directional flow of air (arrow B) from the outlet chamber 77, through the outlet opening 54, is achieved.

Referring to FIGS. 3-11, an outlet vane 75 is operatively disposed in the outlet chamber 77. The outlet vane 75 is movable relative to the directional wall sections 72 between a first position 76 and a second position 78. More specifically, the outlet vane 75 is pivotable about a first pivot axis $R_1$ between the first position 76 and the second position 78, as will be explained in more detail in the embodiments below. The outlet vane 75 may be shaped to control the dispersion of air exiting the outlet chamber 77 through the outlet opening 54.

Referring specifically to FIG. 4, the outlet vane 75 is positioned in the first position 76 with respect to the directional wall section 72 of each of the first and second walls 62, 64. As such, air is allowed to enter the outlet chamber 77 from the inlet chamber 73 and be directed by the respective directional wall sections 72 of each of the first and second walls 62, 64 so as to create a flow direction of air exiting the interior volume 66 (arrow B), through the outlet opening 54. The outlet vane 75 may be positioned to extend in generally parallel relationship to the outlet axis $A_1$. The outlet vane 75 controls a flow path of air about the outlet vane 75 so that the direction of the flow of air, relative to the outlet axis A1, is controlled by the profile or contour of the directional wall section 72 of each of the directional wall sections 72 of the respective walls 62, 64. Thus, a flow direction of air that flows into contact with the outlet vane 75 is not changed by the outlet vane 75 such that air that flows into contact with the outlet vane 75 in the first position 76 may exit the interior volume 66 through the outlet opening 54 in a direction that is generally parallel to the outlet axis $A_1$. However, other portions of air simultaneously flowing into the outlet chamber 77 may flow along the contours of the walls and be directed by the directional wall sections 72 to exit the outlet opening 54 in diverging relationship to the outlet axis $A_1$. Therefore, air exiting the outlet chamber 77 through the outlet opening 54 may have portions of air that exit in a direction that is at least substantially parallel to the outlet axis $A_1$, while also having portions of air that exit in directions that diverge from the outlet axis $A_1$ in opposite directions from one another, as illustrated by the arrows B in FIG. 4. The outlet vane 75 does not restrict airflow through the outlet opening 54. As such, a pressure drop though the air vent 22 is low.

Referring to FIG. 4A, the outlet vane 75 may be operatively disposed in the outlet chamber 77 such that the outlet vane 75 is in the second position 78. In the second position 78, the outlet vane 75 is positioned so that air is permitted to flow between the outlet vane 75 and the directional wall section 72 of the first wall 62, while simultaneously preventing air from flowing between the outlet vane 75 and the directional wall section 72 of the second wall 64 to exit the outlet opening 54. Thus, in the second position 78, the outlet vane 75 deflects air such that the deflected air is directed by the directional wall section 72 of the first wall 62. This means that the outlet vane 75 allows air to travel along the profile of the directional wall section 72 of the first wall 62 and out through the outlet opening 54, while simultaneously preventing air from travelling along the profile of the directional wall section 72 of the second wall 64 to exit the outlet opening 54. Therefore, in the second position 78, air flowing into the outlet chamber 77 may flow along the contours of the directional wall section 72 of the first wall 62 and exit the outlet opening 54 in diverging relationship to the outlet axis $A_1$ (arrow B). It should be appreciated that the second position 78 of the outlet vane 75 may be reversed such that air is permitted to flow between the outlet vane 75 and the directional wall 72 of the second wall 64, while simultaneously preventing air from flowing between the outlet vane 75 and the directional wall 72 of the first wall 62 to exit through the outlet opening 54.

Figure 5:
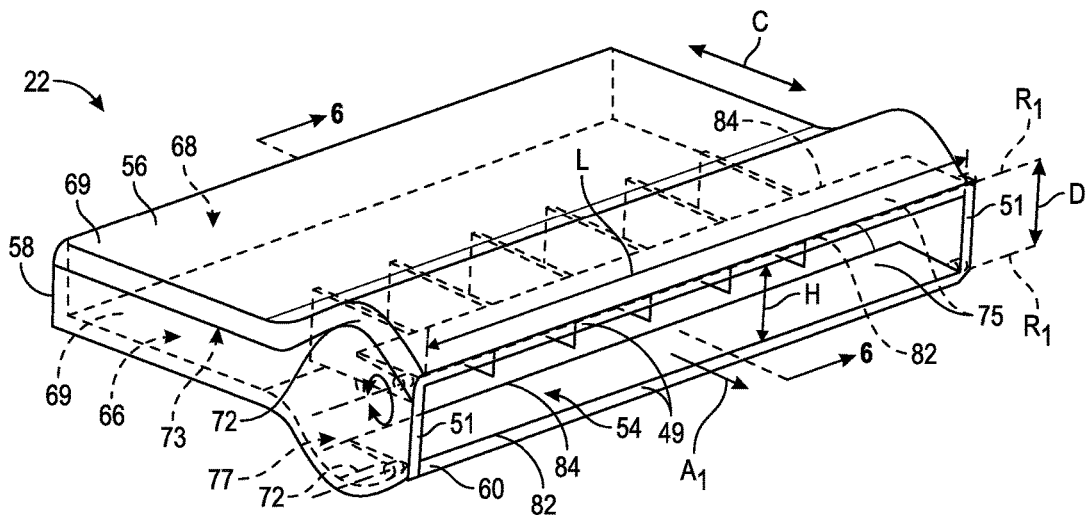
FIG. 5 is a schematic perspective view of the air vent of FIG. 2 having a pair of outlet vanes.

By way of a non-limiting example, with reference to FIGS. 3-5, the aspect ratio of an outlet opening 54 may be approximately 16 and an angle B1 of the directional wall sections 72, relative to the outlet axis A1 are each about 30 degrees. Referring to FIG. 4, when air A is flowing through the air vent 22 at room temperature at an average velocity of 6.1 meters per second (m/s) the pressure drop between the inlet opening 68 and the outlet opening 54 is approximately 50.9 Pascal (Pa) with the outlet vane 75 in the first position 76. Likewise, referring to FIG. 5, with the outlet vane 75 in the second position 78, the outlet vane 74 may be positioned in the second position 78 such that air A is only permitted to flow past the outlet vane 75, along one of the directional walls 72. In this configuration, the pressure drop between the inlet opening 68 and the outlet opening 54 is approximately 65.4 Pa. Therefore, the pressure drop between the inlet opening 68 and the outlet opening 54 may increase by about 29% between the outlet vane 74 being in the first position 76 and the second position 78.

With continued reference to FIGS. 3-4A, the outlet vane 75 extends generally longitudinally between a pivot end 82 and a directional end 84. The first pivot axis $R_1$ extends through the outlet vane 75, proximate the pivot end 82. The directional end 84 is pivotable about the first pivot axis $R_1$, relative to the directional wall sections 72 of the first and second wall 62, 64.

Figure 11:
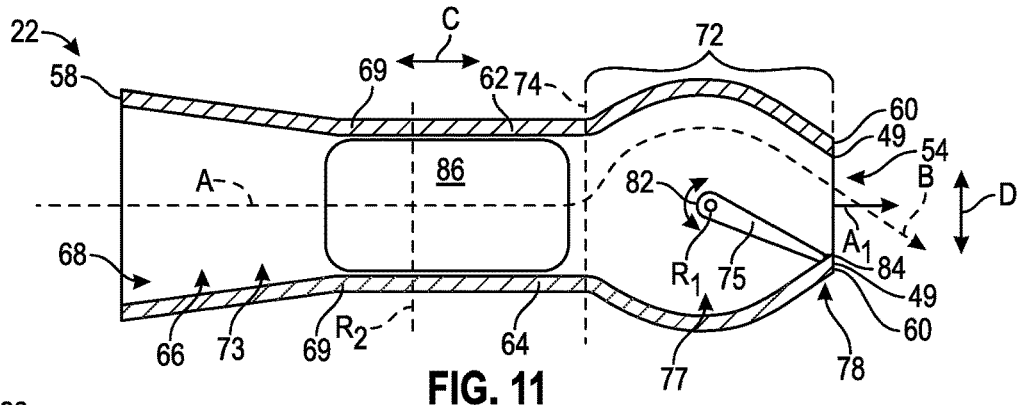

Referring to the embodiments shown in FIGS. 3-4A, the outlet vane 75 may be disposed within the outlet chamber 77 such that the first pivot axis $R_1$ is generally centered between the directional wall sections 72 of first wall 62 and the second wall 64. Therefore, since the outlet vane 75 is pivotable about the first pivot axis $R_1$, the directional end 84 of the outlet vane 75 is configured to selectively contact, or otherwise move in close proximity to, the directional wall section 72 of one of the first and second walls 62, 64, proximate the transition location 74, when the outlet vane 75 is in the second position 78, as illustrated in FIG. 4A. Likewise, the outlet vane 75 does not contact, or is otherwise not in close proximity to, any of the directional wall sections 72 when the outlet vane 75 is in the open position 76, as illustrated in FIG. 4. Referring now to FIG. 11, the air vent 22 is illustrated with the outlet vane 75 being disposed in the outlet chamber 77 such that the directional end 84 selectively contacts, or is extremely close to, the directional wall section 72 of one of the first and second walls 62, 64, proximate respective first sides 49 of the outlet end 60. In this embodiment, due to the proximity of the directional end 84 to the outlet opening 54, the directional end 84 of the outlet vane 75 may be visible to an occupant of the vehicle 20.

Referring now to the embodiment of the air vent 22 shown in FIGS. 5-7B, the outlet vane 75 may be a pair of outlet vanes 75 operatively disposed in the outlet chamber 77. The outlet vanes 75 are disposed within the outlet chamber 77 such that the first pivot axes $R_1$ are disposed proximate the respective first sides 49 of the outlet end 60 and the directional ends 84 are pivotably disposed between the outlet end 60 and the transition location 74. As such, each outlet vane 75 is pivotable between a first position 76, a neutral position 80, and the second position 78. Further, the first pivot axes $R_1$, for each of the pair of outlet vanes 75, are disposed in spaced and generally parallel relationship to one another.

Referring specifically to FIG. 7A, the outlet vanes 75 are pivotable about the first axis $R_1$ such that one of the outlet vanes 75 moves to the first position 76 and the other outlet vane 75 moves to the second position 78. In this configuration the pair of outlet vanes 75 may extend in spaced and generally parallel relationship to one another, where the outlet vane 75 in the first position 76 is immediately adjacent the respective directional wall section 72 such that the vane 75 essentially acts as a portion of the directional wall section 72 to deflect the air. Immediately adjacent means that the directional end 84 is proximate or otherwise actually in contact with the respective directional wall section 72. Therefore, in this position 76 the vane 75 may be used to reshape the directional wall section 72, as dictated by a shape or contour of the outlet vane 75. Likewise, when the outlet vane 75 is in the second position 78, the directional end 84 is spaced from the respective directional wall section 72 so that air is prevented from flowing between the outlet vane 75 and the respective directional wall section 72 to exit the outlet opening 54.

Referring now to FIG. 7B, one of the outlet vanes 75 is in a neutral position 80 and the other outlet vane 75 is in the first position 76. As such, the outlet vane 75 positioned in the first position 76 allows the directional wall section 72 to direct the flow of air exiting (arrow B) the outlet opening 54. Likewise, the other outlet vane 75, positioned in the neutral position 80, is positioned to extend in generally parallel relationship to the outlet axis A1. As such, a flow direction of a portion of air that flows into contact with the outlet vane 75 in the neutral position 80 is not changed. When the outlet vane 75 is in the second position 78, the directional end 84 is located between where the directional end 84 would be when the outlet vane 75 is in the first position 76 and the neutral position 80.

Referring now to FIG. 6, the pair of outlet vanes 75 are each in the neutral position 80. As such, since air is prevented from being directed by the corresponding directional wall sections 72 of both the first wall 62 and the second wall 64, the air flowing through the outlet chamber 77 continues to flow straight through the outlet opening 54 and is not directed by the contour of the directional wall section 72 of either wall 62, 64.

Referring now FIGS. 8 and 9, another embodiment of the air vent 22 is illustrated. In this embodiment, the air vents 22 may be arranged in stacked relationship to one another such that the outlet openings 54 are generally planar and parallel with one another. In this embodiment, each air vent 22 may have any desired arrangement with respect to contour of the directional wall sections 72, the number and location of the outlet vanes 75, and the like. Further, any desired number of air vents 22 may be stacked together.

Figure 10:
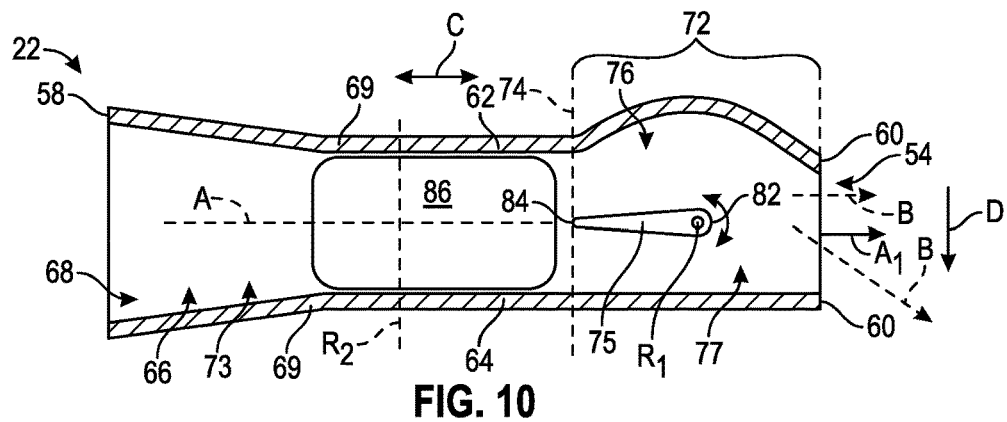
FIGS. 10-13 are schematic cross-sectional side views of additional embodiments of the air vent of FIG. 2.

Referring to the embodiment of the air vent 22 shown in FIG. 10, the directional wall section 72 of the second wall 64 may extend linearly from transition location 74 to the outlet end 60, while the directional wall section 72 of the first wall 62 extends non-linearly along the directional wall section 72. As such, a flow direction of air travelling along the directional wall section 72 of the second wall 64 is not influenced by that directional wall section 72, while the directional wall section 72 of the first wall 62 is configured to change the direction the air flows out of the outlet opening 54 (arrow B).

Figure 12:
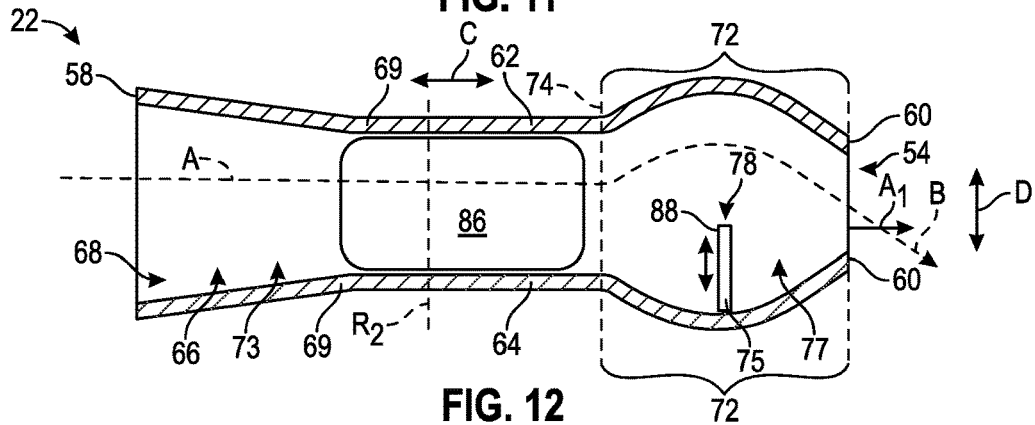

Referring to the embodiment of the air vent 22 shown in FIG. 12, the outlet vane 75 may be slidable within the outlet chamber 77 to selectively block the flow of air between the outlet vane 75 and a directional wall section 72 of one of the walls 62, 64. Therefore, as illustrated in FIG. 12, the outlet vane 75 may be in the second position 78, whereby air is permitted to flow between the outlet vane 75 and the directional wall section 72 of the first wall 62, while preventing air from flowing between the outlet vane 75 and the directional wall section 72 of the second wall. As such, air exits the outlet opening 54 in a flow direction dictated by the contours of the directional wall section 72 of the first wall 62 (arrow B). However, the outlet vane 75 is slidable within the outlet chamber 77 to another second position 78, where air is permitted to flow between the outlet vane 75 and the directional wall section 72 of the second wall 64, while air is prevented from flowing between the outlet vane 75 and the first wall 62. As such, air is permitted to exit the outlet opening 54 in a flow direction dictated by the contours of the directional wall section 72 of the second wall 62, in a flow direction that is different than the flow direction dictated by the directional wall section 72 of the first wall 62. In this embodiment, the outlet vane 75 may have a generally perpendicular cross-section, where the outlet vane 75 presents a blocking surface 88 that faces the inlet opening 68. As such, the outlet vane 75 is disposed in the outlet chamber 77 such that the blocking surface may be normal to the flow of air entering the outlet chamber 77 from the inlet chamber 73. It should be appreciated that the outlet vane 75 may have other shapes as desired.

Figure 13:
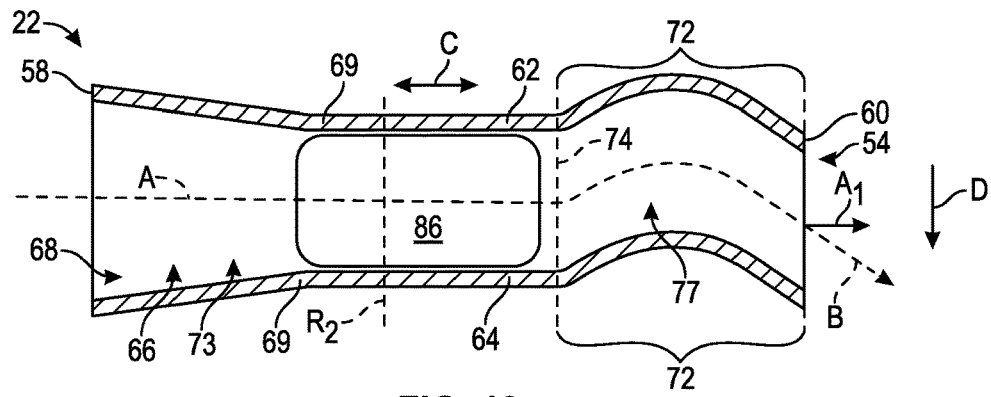

Referring now to the embodiment of the air vent 22 shown in FIG. 13, the directional sections of the first and second walls 62, 64 may extend from the transition location 74 in spaced in generally parallel relationship to one another. Further, the directional sections may be arched such that the directional sections are nested to present a curvilinear profile. Air follows the contours of the directional wall sections 72 for each wall 62, 64 such that air may exit the outlet opening 54 (arrow B) in diverging relationship to the outlet axis $A_1$. Further, an outlet vane 75 is not disposed in the outlet chamber 77, as the curvilinear profile of each directional wall section 72 may be used to direct air toward a targeted location, where adjustability may not be required.

Referring again to FIGS. 3-6 and 8-13, the air vents 22 may also include a plurality of inlet vanes 86 that are operatively disposed in the interior volume 66 between the outlet vane 75 and the inlet end 58. These inlet vanes 86 are each pivotable about a second pivot axis R2. The inlet vanes 86 are disposed at least partially in the inlet chamber 73 such that the second pivot axes R2 may extend in perpendicular relationship to the first pivot axis $R_1$ of the outlet vanes 75. The inlet vanes 86 are configured to direct the flow of air entering the outlet chamber 77. More specifically, the inlet vanes 86 are configured to direct air in a direction that is normal to the direction air is directed by the directional wall sections 72. Therefore, by way of a non-limiting example, if the air vent 22 is disposed in the vehicle 20 such that the outlet axis $A_1$ extends horizontally and the outlet vanes 75 direct air in an up/down direction, relative to the outlet axis $A_1$, the inlet vanes 86 are configured to direct air in a lateral, left/right direction, relative to the outlet axis $A_1$, normal to the up/down direction. It should be appreciated that, regardless of the orientation of the air vent 22 within the vehicle 20. The inlet vanes 86 direct the flow of air normal to the direction by the outlet vane(s) 75.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An air vent for a vehicle having a heating, ventilation, and air conditioning (HVAC) system, the air vent comprising:
   a housing extending longitudinally between an inlet end and an outlet end, wherein the housing includes an inlet chamber and an outlet chamber, and wherein a direction of airflow is defined between the inlet end and the outlet end;
   wherein the housing includes a first wall and a second wall disposed in spaced relationship to the first wall such that the first wall and the second wall cooperate to define an interior volume therebetween that includes the inlet chamber and the outlet chamber;
   wherein the first and second walls extend longitudinally between the inlet end and the outlet end;
   wherein the inlet end defines an inlet opening in communication with the interior volume such that air is permitted to enter the inlet chamber through the inlet opening;
   wherein the outlet end defines an outlet opening in communication with the interior volume such that the air is permitted to exit the outlet chamber through the outlet opening;
   wherein the outlet opening is perpendicular to an outlet axis;
   wherein the first wall and the second wall cooperate to form the inlet chamber and the outlet chamber including a directional wall section that extends non-linearly between the transition location and the outlet end and defines an outlet chamber;
   wherein the first wall includes a first curvilinear wall section that terminates at the outlet end;
   wherein the second wall includes a second curvilinear wall section that terminates at the outlet end;
   wherein the first and second curvilinear wall sections define the outlet chamber;
   an inlet vane being disposed in the inlet chamber, and pivotable about a first axis that is perpendicular to the direction of airflow;
   an outlet vane being completely disposed within the outlet chamber and pivotable about a second axis that is perpendicular to the first axis and perpendicular to the direction of airflow;
   wherein the outlet vane includes a planar device that includes a pivot end and a directional end that are disposed within the outlet chamber, wherein the pivot end includes a pivot axis that is parallel to the second axis;
   wherein the outlet vane is pivotable about the pivot axis to one of a neutral position, a first position and a second position;
   wherein the outlet vane is disposed to direct the air towards the first curvilinear wall section when the outlet vane is pivoted to the first position;
   wherein the outlet vane is disposed to direct the air towards the second curvilinear wall section when the outlet vane is pivoted to the second position; and
   wherein the air is not directed towards either the first curvilinear wall section or the second curvilinear wall section when the outlet vane is pivoted to the neutral position.

2. The air vent, as set forth in claim 1, wherein the outlet vane is disposed within the outlet chamber such that the second axis is centered between the first wall and the second wall.

3. The air vent, as set forth in claim 1, wherein the outlet vane is disposed within the outlet chamber such that the second axis is proximate to the outlet end and the directional end is pivotably disposed between the pivot end of the outlet vane and the transition location.

4. The air vent, as set forth in claim 1, wherein the outlet vane comprises a pair of outlet vanes disposed in the outlet chamber;
   wherein the outlet vanes are completely disposed in the outlet chamber and are pivotable about respective second and third axes that are both perpendicular to the first axis and perpendicular to the direction of airflow; and
   wherein the second and third axes are disposed in spaced and generally parallel relationship to one another.

5. The air vent, as set forth in claim 4, wherein the outlet vanes are each pivotable about the respective second and third axes between the first position, a neutral position, and the second position;
   wherein in the first position, directional ends of the outlet vanes are immediately adjacent the respective first and second wall;
   wherein, in the neutral position, the directional ends of the outlet vanes are is spaced from the first and second walls and the outlet vane extends parallel to the flow of air entering the outlet chamber; and
   wherein in the second position, the directional ends of the outlet vanes are disposed between the location of the directional end when in each of the first position and the neutral position.

6. The air vent, as set forth in claim 4, wherein the pair of outlet vanes are pivotable about the respective second and third axes such that each vane is independently selectively positionable in each of the first position, the neutral position, and the second position.

7. A vehicle comprising:
   a vehicle body defining a vehicle interior;

a heating, ventilation, and air conditioning (HVAC) system; and an air vent assembly in fluid communication with the HVAC system, the air vent assembly including:

a housing extending longitudinally between an inlet end and an outlet end, wherein the housing includes an inlet chamber and an outlet chamber, and wherein a direction of airflow is defined between the inlet end and the outlet end;

wherein the housing includes a first wall and a second wall disposed in spaced relationship to the second wall such that the first wall and the second wall cooperate to define an interior volume therebetween that includes the inlet chamber and the outlet chamber;

wherein the first wall extends longitudinally between the inlet end and the outlet end;

wherein the inlet end defines an inlet opening in communication with the interior volume such that air is permitted to enter the inlet chamber through the inlet opening;

wherein the outlet end defines an outlet chamber in communication with the interior volume such that the air is permitted to exit the interior volume through the outlet opening;

wherein the outlet opening is perpendicular to an outlet axis; and wherein the first and second walls cooperate to form the inlet chamber and the outlet chamber including a directional wall section that extends non-linearly between the transition location and the outlet end and defines an outlet chamber;

wherein the first wall includes a first wall section that terminates at the outlet end;

wherein the second wall includes a second wall section that terminates at the outlet end;

wherein the first and second wall sections define the outlet chamber;

wherein an outlet vane is completely disposed within the outlet chamber and includes a planar device that includes a pivot end and a directional end that are disposed within the outlet chamber, wherein the pivot end includes a axis that is parallel to the second axis;

wherein the outlet vane is pivotable about the axis to one of a neutral position, a first position and a second position;

wherein the outlet vane is disposed to direct the air towards the first wall section in the outlet chamber when the outlet vane is pivoted to the first position;

wherein the outlet vane is disposed to direct the air towards the second wall section in the outlet chamber when the outlet vane is pivoted to the second position; and wherein the air is not directed towards either the first wall section or the second wall section when the outlet vane is pivoted to the neutral position.

8. The vehicle, as set forth in claim 7, wherein the outlet end has a generally rectangular profile that includes:

a pair of first sides extending in spaced and parallel relationship to one another; and a pair of second sides extending in spaced and generally parallel relationship to one another and extending in generally perpendicular relationship to the pair of first sides such that the outlet opening is defined by the pairs of first and second sides;

wherein each of the pair of first sides extends along a length and each of the pair of second sides extends along a height; and wherein an aspect ratio of the length to the height is at least 5.

\* \* \* \* \*

UNITED STATES PATENT AND TRADEMARK OFFICE
CERTIFICATE OF CORRECTION

| | | |
|---|---|---|
| PATENT NO. | : 10,099,536 B2 | Page 1 of 1 |
| APPLICATION NO. | : 14/557913 | |
| DATED | : October 16, 2018 | |
| INVENTOR(S) | : Douglas Albin | |

It is certified that error appears in the above-identified patent and that said Letters Patent is hereby corrected as shown below:

In the Claims

Column 12, Line 7, in Claim 7, "includes a axis that is parallel" should read --includes a pivot axis that is parallel;--

Column 12, Line 8, in Claim 7, "about the axis to one of a neutral position" should read --about the pivot axis to one of a neutral position;--

Signed and Sealed this
Eleventh Day of December, 2018

Andrei Iancu
*Director of the United States Patent and Trademark Office*